United States Patent
Lee et al.

(10) Patent No.: US 8,565,742 B2
(45) Date of Patent: Oct. 22, 2013

(54) MULTI-STANDBY MOBILE TERMINAL AND HOST FUNCTION PROVIDING METHOD FOR THE SAME

(75) Inventors: Kwang Min Lee, Suwon-si (KR); Mathew Lee, Seongnam-si (KR); Jae Suk Kim, Suwon-si (KR); Seong Hyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 439 days.

(21) Appl. No.: 12/358,045

(22) Filed: Jan. 22, 2009

(65) Prior Publication Data

US 2009/0186608 A1     Jul. 23, 2009

(30) Foreign Application Priority Data

Jan. 23, 2008  (KR) .................. 10-2008-0007169
May 14, 2008  (KR) .................. 10-2008-0044322

(51) Int. Cl.
*H04M 3/42*         (2006.01)
(52) U.S. Cl.
USPC ............... 455/416; 455/414.1; 455/414.2
(58) Field of Classification Search
USPC ............... 455/414.2, 416–417, 459–463, 455/517–519, 552.1, 563–567; 379/56.1, 379/67.1
See application file for complete search history.

(56) References Cited

U.S. PATENT DOCUMENTS

| | | | |
|---|---|---|---|
| 6,317,582 B1 | 11/2001 | Yoshinaga | |
| 6,366,649 B1* | 4/2002 | Chun et al. | 379/88.01 |
| 7,107,208 B2* | 9/2006 | Cho et al. | 704/212 |
| 2001/0051869 A1 | 12/2001 | Cho et al. | |
| 2003/0225832 A1* | 12/2003 | Ludwig | 709/204 |
| 2006/0019698 A1* | 1/2006 | Ahya et al. | 455/552.1 |
| 2007/0110029 A1 | 5/2007 | Gilmore, II et al. | |

FOREIGN PATENT DOCUMENTS

| | | |
|---|---|---|
| EP | 1 052 863 A2 | 11/2000 |
| WO | 99/63735 A1 | 12/1999 |

* cited by examiner

*Primary Examiner* — Chuong A Ngo
(74) *Attorney, Agent, or Firm* — Jefferson IP Law, LLP (57) ABSTRACT

A multi-standby mobile terminal and a method for providing a host function between different networks in a multi-standby mobile terminal are provided. The method includes creating a call from a first mobile terminal, as a multi-standby mobile terminal, to a second mobile terminal on a first network and to a third mobile terminal on a second network, outputting a received voice signal through a speaker from the first mobile terminal, when the voice signal is received from one of the second mobile terminal and third mobile terminal, and, transmitting, from the first mobile terminal, the received voice signal through a loopback process to the one of the second mobile terminal and third mobile terminal that does not transmit the voice signal.

10 Claims, 6 Drawing Sheets

MULTI-STANDBY MOBILE TERMINAL AND HOST FUNCTION PROVIDING METHOD FOR THE SAME

PRIORITY

This application claims the benefit under 35 U.S.C. §119 (a) of a Korean patent application filed on Jan. 23, 2008 in the Korean Intellectual Property Office and assigned Ser. No. 2008-0007169, and of a Korean patent application filed in the Korean Intellectual Property Office on May 14, 2008 and assigned Ser. No. 2008-0044322, the entire disclosures of both of which are hereby incorporated by reference.

BACKGROUND OF THE INVENTION

1. Field of the Invention

The present invention relates generally to a mobile terminal. More particularly, the present invention relates to a multi-standby mobile terminal that supports multi-party conversations and data sharing between other mobile terminals on distinct networks and to a method of providing a host function for the same.

2. Description of the Related Art

With advances in communication technologies, modern mobile terminals provide diverse functions. More particularly, recently developed multi-mode mobile terminals can receive services from two or more different mobile communication networks.

Unlike a single-mode mobile terminal which can communicate within the service area of a single mobile communication network, a multi-mode mobile terminal can communicate within the service areas of two or more different mobile communication networks. For example, a dual-mode mobile terminal supporting a Code Division Multiple Access (CDMA) network and a Global System for Mobile communications (GSM) network can receive services from both the service area of a CDMA network and the service area of a GSM network. Hence, a dual-mode mobile terminal provides greater availability than a single-mode mobile terminal.

In a dual-mode mobile terminal, switching between different networks involves menu manipulation in an idle mode and rebooting, thus requiring a manual operation and a long duration of time.

Therefore, dual-standby mobile terminals have been developed that can simultaneously communicate with multiple networks, for example, a CDMA network and a GSM network.

For a multi-party conversation, when a dual-standby mobile terminal is connected to multiple mobile terminals on a single network, a conference call is registered as a supplementary string in the network and controlled accordingly.

However, when a dual-standby mobile terminal is connected to multiple mobile terminals on different networks, one of the mobile terminals may not be registered in the network serving the other mobile terminal. Hence, unlike the above single network case, the dual-standby mobile terminal can communicate one by one with the mobile terminals on the different networks, but cannot provide a conference call service. That is, one user can have a separate conversation with one of multiple counterparts at a time, but the counterparts cannot participate in the multi-party conversations at the same time as in the case of a conference call.

In other words, when a dual-standby mobile terminal communicates separately with mobile terminals on different networks, the mobile terminals on the different networks may be unable to join a conference call together.

Therefore, a need exists for a mobile terminal and method for allowing mobile terminals on different networks to join a conference call.

SUMMARY OF THE INVENTION

An aspect of the present invention is to address at least the above-mentioned problems and/or disadvantages and to provide at least the advantages described below. Accordingly, an aspect of the present invention is to provide an apparatus and method that enable a multi-standby mobile terminal to provide a conference call between mobile terminals on different networks.

Another aspect of the present invention is to provide an apparatus and method that enable a multi-standby mobile terminal to provide a data sharing function to mobile terminals on different networks.

Still another aspect of the present invention is to provide an apparatus and method that enable a multi-standby mobile terminal to function as a host for voice data transfer and data sharing between mobile terminals on different networks when the multi-standby mobile terminal is connected through a call with the mobile terminals.

In accordance with an aspect of the present invention, a method for providing a host function between different networks in a multi-standby mobile terminal is provided. The method includes creating a call from a first mobile terminal, as a multi-standby mobile terminal, to a second mobile terminal on a first network and to a third mobile terminal on a second network, outputting a received voice signal through a speaker of the first mobile terminal, when the voice signal is received from at least one of the second mobile terminal and third mobile terminal, and transmitting, from the first mobile terminal, the received voice signal through a loopback process to one of the second mobile terminal and third mobile terminal that does not transmit the voice signal.

The method may further include forming at least one transmission path by reserving at least one of communication modules leading respectively to the second mobile terminal and third mobile terminal, when a voice signal is input from a microphone, and transmitting the input voice signal to at least one of the second mobile terminal and third mobile terminal through the at least one of the communication modules.

The method may further include receiving, by the first mobile terminal, data from at least one of the second mobile terminal and third mobile terminal, storing the received data in a sharing storage area, and transmitting, from the first mobile terminal, the received data to the one of the second mobile terminal and third mobile terminal that does not transmit the voice signal.

At least one of a master modem and a slave modem for receiving data stores the received data in a sharing storage area, and outputs an interrupt signal for notification to the modem associated with a transmission path for the data.

In accordance with another aspect of the present invention, a multi-standby mobile terminal is provided. The multi-standby mobile terminal includes at least two communication modules for establishing communication channels to corresponding mobile terminals on distinct networks to transmit and receive voice signals and data, a control unit for controlling voice transmission paths involving the communication modules and for controlling an operation to transmit at least one of a received voice signal and received data to the remaining mobile terminals when at least one of a voice signal and data is received from one of the mobile terminals, a vocoder for converting a voice signal in a preset format and for converting a voice signal for loopback; a codec for outputting a voice signal input from the vocoder to a speaker and for outputting a voice signal input from a microphone to the vocoder, and a memory unit for storing data received through the communication modules.

The memory unit may include a first storage area for storing data associated with the master modem, a second storage area for storing data associated with the slave modem, and a sharing storage area for functioning as a medium relating the master modem and slave modem together and for storing data derived from the first storage area and second storage area for data sharing.

The master modem outputs, after moving data from the first storage area to the sharing storage area, an interrupt signal to the slave modem, and moves, in response to an interrupt signal from the slave modem, data from the sharing storage area to the first storage area.

The slave modem outputs, after moving data from the second storage area to the sharing storage area, an interrupt signal to the master modem, and moves, in response to an interrupt signal from the master modem, data from the sharing storage area to the second storage area.

In an exemplary implementation, the multi-standby mobile terminal, which communicates with two or more different networks at the same time, may provide a multiparty call service to other mobile terminals on different networks. That is, the multi-standby mobile terminal of the present invention enables a conference call between mobile terminals on different networks. The multi-standby mobile terminal also enables data sharing between mobile terminals on different networks.

In addition, when the multi-standby mobile terminal is connected to other mobile terminals on different networks, the multi-standby mobile terminal may act as a host enabling voice data transfer and data sharing between the mobile terminals.

Hence, a new supplementary service is added to the multi-standby mobile terminal, increasing user convenience.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a multi-standby mobile terminal of the present invention communicates with a Code Division Multiple Access (CDMA) network and a Global System for Mobile communications (GSM) network. However, the present invention is not limited thereto, and the multi-standby mobile terminal may also communicate with other types of networks.

A 'network' may denote one of a CDMA network, a GSM network, a network capable of providing a packet service and an extended or modified version thereof.

For the purpose of description, a dual-standby mobile terminal capable of simultaneously communicating with a CDMA network and GSM network is described as a multi-standby mobile terminal. The multi-standby mobile terminal may also communicate with two or more of a CDMA network, GSM network and other types of networks.

In exemplary embodiments of the present invention, when the multi-standby mobile terminal is connected to other mobile terminals on different networks, the multi-standby mobile terminal permits all users in conversation to join a call for a multiparty conversation. During the multiparty connection, the multi-standby mobile terminal also permits all the users in conversation to share data. That is, when the multi-standby mobile terminal is connected to other mobile terminals on different networks, the multi-standby mobile terminal may transfer voice signals and data between mobile terminals.

An exemplary configuration of a multi-standby mobile terminal and a host function providing method for the same are described in connection with the drawings.

Figure 1:
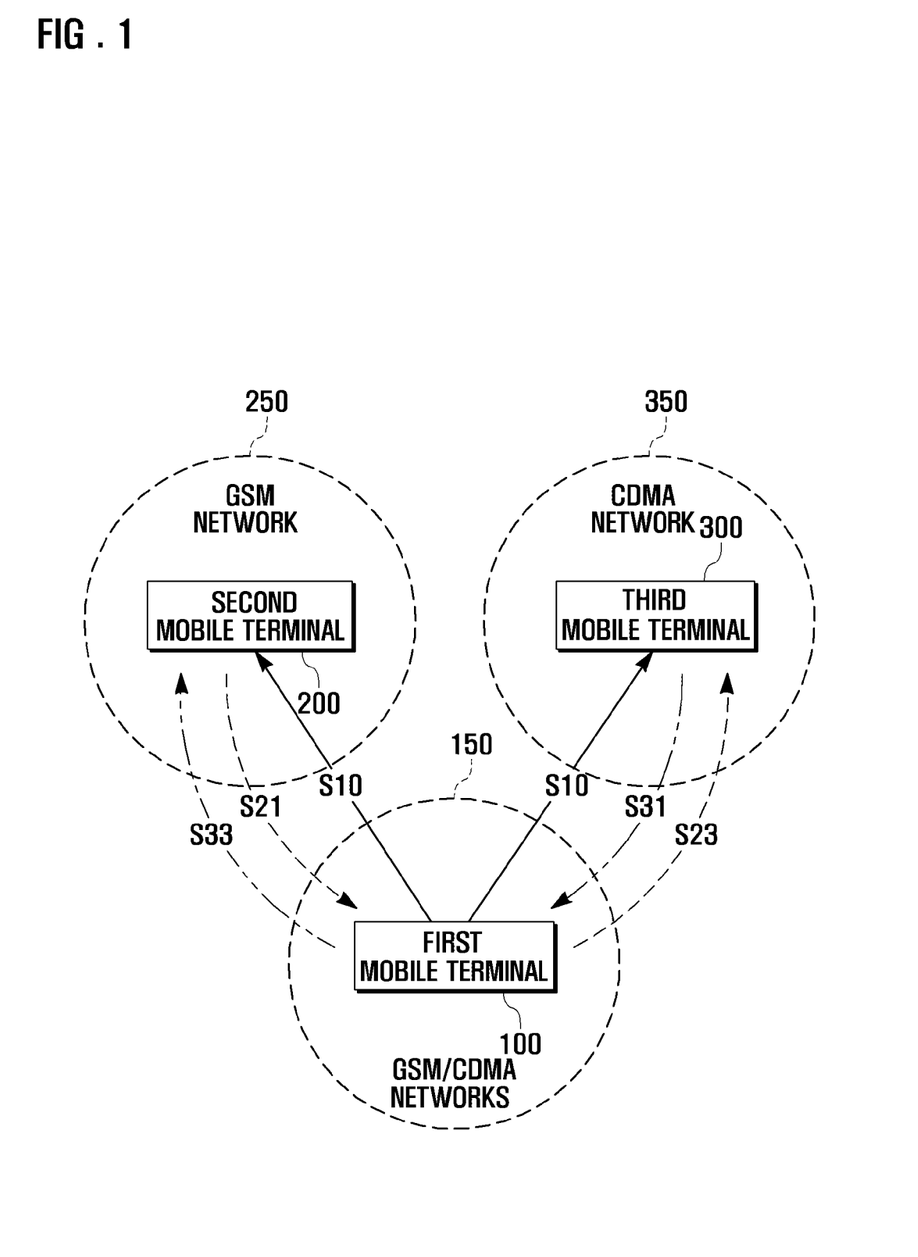
FIG. 1 illustrates a voice signal and data transfer between mobile terminals on different networks according to an exemplary embodiment of the present invention.

FIG. 1 illustrates voice signal/data transfer between mobile terminals on different networks according to an exemplary embodiment of the present invention.

In FIG. 1, a first mobile terminal 100 is a multi-standby mobile terminal simultaneously communicating with GSM and CDMA networks 150, a second mobile terminal 200 is a mobile terminal communicating with a GSM network 250 and a third mobile terminal 300 is a mobile terminal communicating with a CDMA network 350.

In the network environments, the first mobile terminal 100 is connected to both the second mobile terminal 200 and the third mobile terminal 300. That is, the first mobile terminal 100 is connected to the second mobile terminal 200 through a GSM communication module for communication with the GSM network 250, and is connected to the third mobile terminal 300 through a CDMA communication module for communication with the CDMA network 350.

The first mobile terminal 100 may activate a host function associated with one of a conference call and data sharing between the mobile terminals 200 and 300 on the GSM network 250 and the CDMA network 350 according to a host function control scheme set in advance or by a user request.

The host function control scheme may automatically activate the host function when mobile terminals on different networks are connected together. Alternatively, when mobile terminals on different networks are connected together, the user may activate the host function by inputting a preset key. The host function is related to at least one of conference calling and data sharing.

When the host function is activated, the first mobile terminal 100 establishes a communication path to each of the second mobile terminal 200 and third mobile terminal 300, and sends a generated voice signal and data to the second mobile terminal 200 on the GSM network 250 and to the third mobile terminal 300 on the CDMA network 350.

After establishing the communication paths, the first mobile terminal 100 may send a generated voice signal and data to a selected one of the second mobile terminal 200 on the GSM network 250 and the third mobile terminal 300 on the CDMA network 350. Thereto, the first mobile terminal 100 may leave open a transmission path leading to the selected mobile terminal and temporarily block a transmission path leading to the other mobile terminal. In this case, the reception path from the mobile terminal associated with the blocked transmission path may be left open or blocked. Therefore, reception of a voice signal or data from the mobile terminal may be continued or discontinued accordingly.

For the host function related to a voice signal, the first mobile terminal 100 converts an analog voice signal of the user input from a microphone using Pulse Code Modulation (PCM) into PCM data, further converts the PCM data into a voice packet, and sends the voice packet to both the second mobile terminal 200 and third mobile terminal 300 (S10). To send voice packets, the first mobile terminal 100 may use a first communication module connecting to the second mobile terminal 200 on the GSM network 250, and a second communication module connecting to the third mobile terminal 300 on the CDMA network 350.

When a voice packet is received from the second mobile terminal 200 on the GSM network 250 (S21), the first mobile terminal 100 buffers the received voice packet, converts the voice packet into PCM data through pulse code modulation, further converts the PCM data into an analog voice signal and outputs the analog voice signal through a speaker. At the same time, for loopback of voice data, the first mobile terminal 100 converts the PCM data corresponding to the received voice packet into a voice packet (similar to a voice signal from the microphone), and sends the voice packet to the third mobile terminal 300 on the CDMA network 350 (S23). That is, voice packets from the second mobile terminal 200 on the GSM network 250 are output through the speaker of the first mobile terminal 100 and also sent to the third mobile terminal 300 on the CDMA network 350.

Similarly, when a voice packet is received from the third mobile terminal 300 on the CDMA network 350 (S31), the first mobile terminal 100 buffers the received voice packet, converts the voice packet into PCM data through pulse code modulation, further converts the PCM data into an analog voice signal, and outputs the analog voice signal through the speaker. At the same time, for loopback of voice data, the first mobile terminal 100 converts the PCM data corresponding to the received voice packet into a voice packet (similar to a voice signal from the microphone), and sends the voice packet to the second mobile terminal 200 on the GSM network 250 (S33). That is, voice packets from the third mobile terminal 300 on the CDMA network 350 are output through the speaker of the first mobile terminal 100 and also sent to the second mobile terminal 200 on the GSM network 250.

As described above, the first mobile terminal 100 may send an input voice signal to at least one of the second mobile terminal 200 and third mobile terminal 300 on the GSM network 250 and the CDMA network 350. In addition, when a voice signal is received from one of the second mobile terminal 200 and the third mobile terminal 300, the first mobile terminal 100 outputs the received voice signal through the speaker and also sends the received voice signal to the other one of the second mobile terminal 200 and the third mobile terminal 300. Hence, the user of one of the second mobile terminal 200 and the third mobile terminal 300 on the GSM network 250 and CDMA network 350 may receive the voice signal that the user of the other mobile terminal sends to the first mobile terminal 100. That is, a multiparty call between different networks may be served.

For the host function related to data, the first mobile terminal 100 sends its data to the second mobile terminal 200 and third mobile terminal 300. In this case, the first mobile terminal 100 sends data through the first communication module for GSM communication to the second mobile terminal 200 on the GSM network 250, and also sends the data through the second communication module for CDMA communication to the third mobile terminal 300 on the CDMA network 350 (S10). In an exemplary embodiment of the present invention, the data may include any type of data that may be generated in a mobile terminal such as a photograph, a moving image, a song, a text message, an electronic mail, a document and the like.

When data is received from the second mobile terminal 200 on the GSM network 250 (S21), the first mobile terminal 100 may store the received data in a first storage area. The first mobile terminal 100 may transfer the received data stored in the first storage area to a sharing storage area for data sharing, and further transfer the received data to a second storage area. The first mobile terminal 100 sends the received data in the second storage area to the third mobile terminal 300 on the CDMA network 350 (S23). During the data transfer, the first mobile terminal 100 may output the data received from the second mobile terminal 200 through its output unit, such as a display unit or speaker.

Similarly, when data is received from the third mobile terminal 300 on the CDMA network 350 (S31), the first mobile terminal 100 may store the received data in the second storage area. The first mobile terminal 100 may transfer the received data stored in the second storage area to the sharing storage area for data sharing, and further transfer the received data to the first storage area. The first mobile terminal 100 sends the received data in the first storage area to the second mobile terminal 200 on the GSM network 250 (S33). During this data transfer, the first mobile terminal 100 may output the data received from the third mobile terminal 300 through its output unit such as a display unit or speaker.

Figure 2:
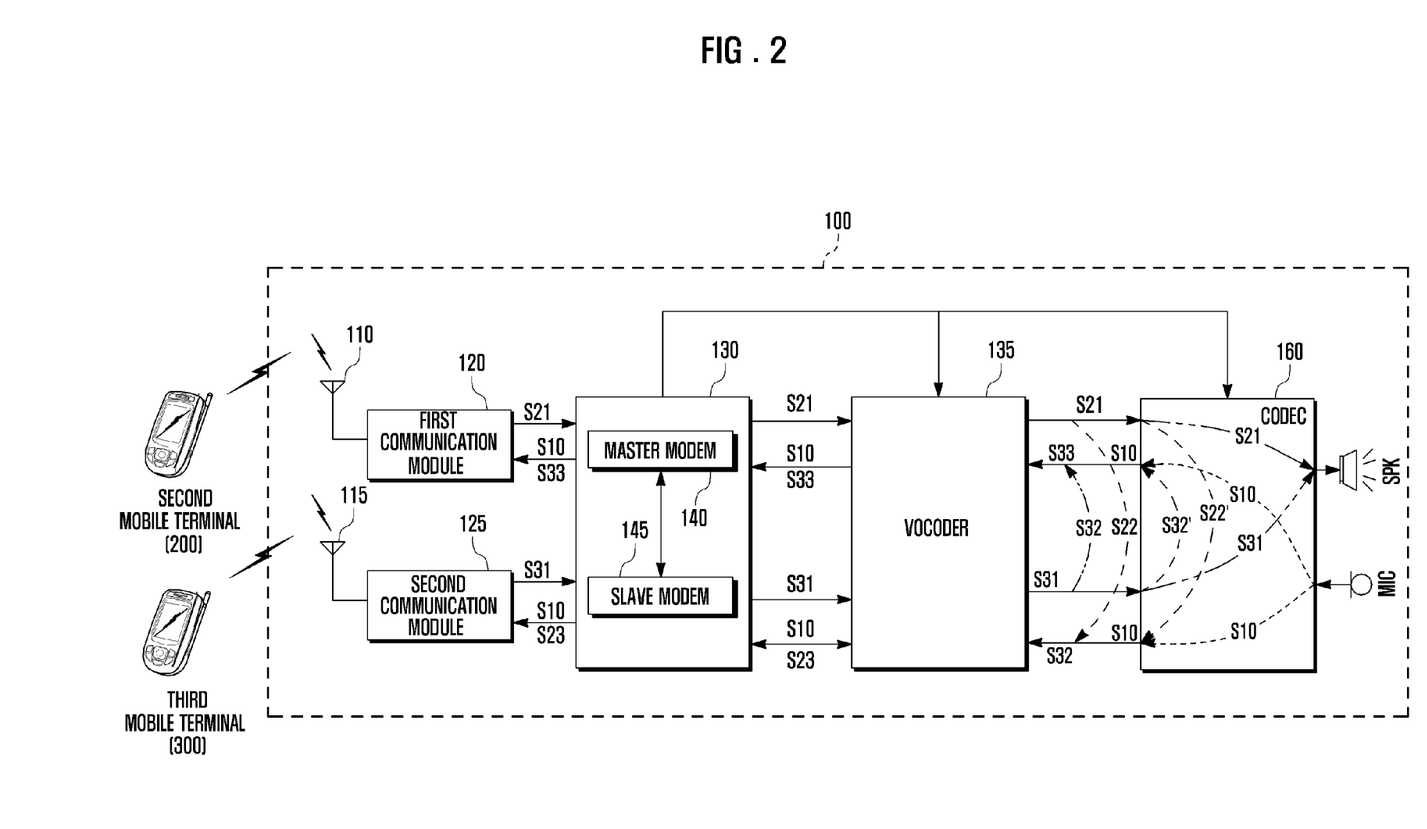
FIGS. 2 and 3 are block diagrams illustrating a mobile terminal according to an exemplary embodiment of the present invention.
Figure 3:
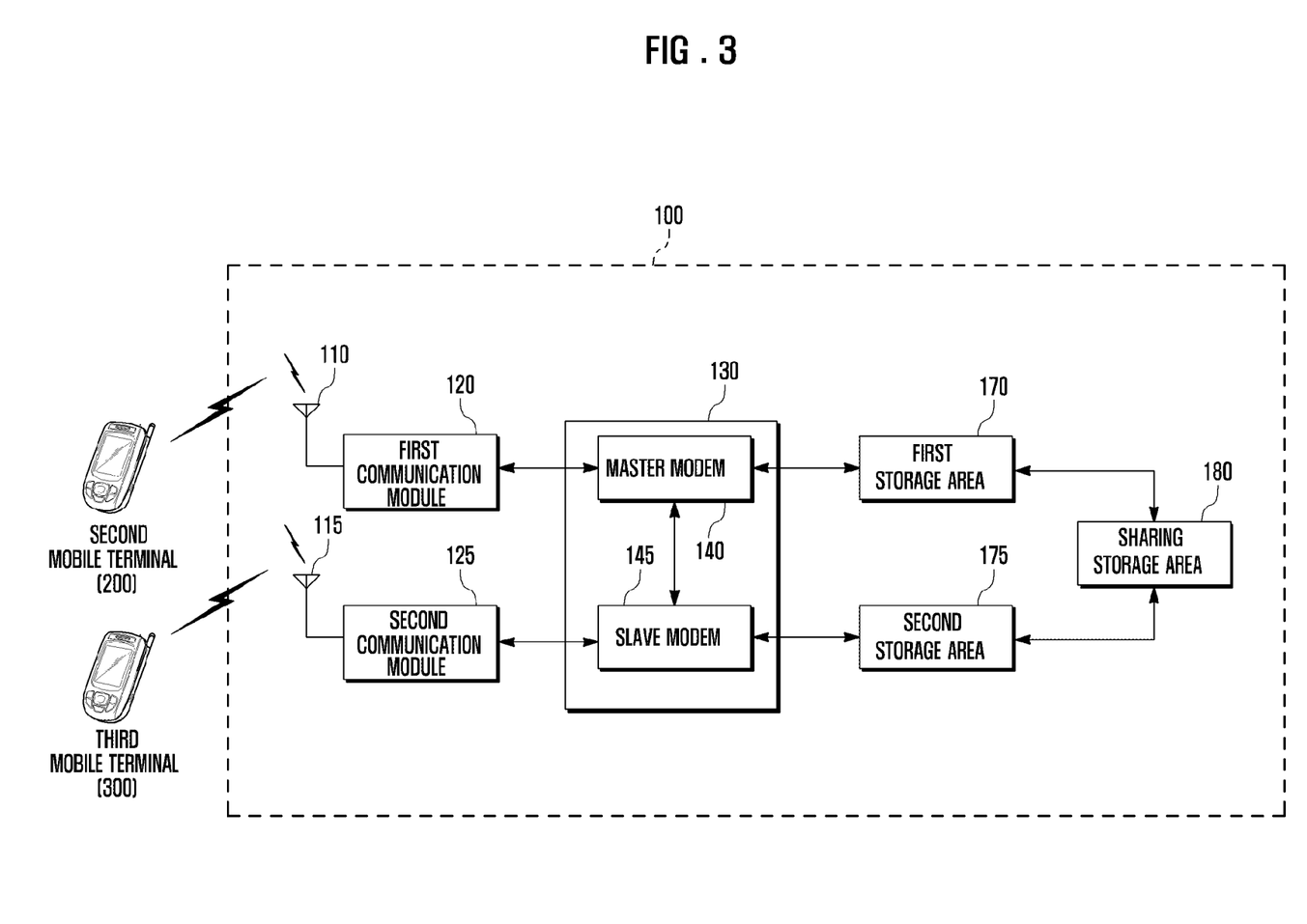

FIGS. 2 and 3 are block diagrams illustrating a mobile terminal according to an exemplary embodiment of the present invention. FIG. 2 is related to voice signal transfer, and FIG. 3 is related to data transfer. The configurations shown in FIGS. 2 and 3 are only for the purpose of description, and are merely examples of the multi-standby mobile terminal of the present invention.

The mobile terminal in FIGS. 2 and 3 is a dual-standby mobile terminal and is assumed to be in overlapping service areas of a GSM network and CDMA network. The mobile terminal as a dual-standby mobile terminal may include two slots accommodating CDMA and GSM cards for communicating with the corresponding networks, or one slot accommodating a dual card supporting both the CDMA network and GSM network.

Referring to FIGS. 2 and 3, the dual-standby mobile terminal having a host function includes a first antenna 110, second antenna 115, first communication module 120 for a first communication service (for example, a GSM communication service), second communication module 125 for a second communication service (for example, a CDMA communication service), control unit 130, vocoder 135, codec 160, first storage area 170, second storage area 175, and sharing storage area 180.

The control unit 130 includes a master modem 140 and slave modem 145. In the description, it is assumed that the master modem 140 controls communication with the GSM network as a primary controller and the slave modem 145 controls communication with the CDMA network. The roles of the master modem 140 and slave modem 145 are not fixed and may be changed according to their performance.

The first antenna 110 covers a first frequency band for a first communication service (for example, a GSM communication service), and the second antenna 115 covers a second frequency band for a second communication service (for example, a CDMA communication service). Although the first antenna 110 and second antenna 115 are configured as separate antennas in FIGS. 2 and 3, they may be configured as a single antenna covering multiple frequency bands.

The first communication module 120 establishes a communication channel to the GSM network serving a mobile terminal (the second mobile terminal 200), and sends and receives Radio Frequency (RF) signals according to GSM communication. The second communication module 125 establishes a communication channel to the CDMA network serving a mobile terminal (the third mobile terminal 300), and sends and receives RF signals according to CDMA communication.

The control unit 130 functions as a special purpose processor that controls the first communication module 120 and second communication module 125 to communicate with corresponding networks. The control unit 130 also controls signal exchange between the first communication module 120, second communication module 125, vocoder 135, codec 160, first storage area 170, second storage area 175 and sharing storage area 180.

When a request for answering a call is issued from a communication network or a request for making a call to a communication network is issued by the user, the control unit 130 determines a requested communication service, and controls at least one of the first communication module 120 and second communication module 125 to connect to a corresponding network according to the determination.

For example, when a communication service is requested from the GSM network or the CDMA network, the control unit 130 controls at least one of the first communication module 120 and second communication module 125 to connect to the requesting network. When communication services are requested simultaneously from the GSM network and CDMA network, the control unit 130 controls the first communication module 120 and the second communication module 125 to connect to the corresponding networks. When a request for a private conversation is issued by the user after two connections are made through the first communication module 120 and the second communication module 125, the control unit 130 may block the operation of an unrequested one of the first communication module 120 and second communication module 125.

The control unit 130 may control the first communication module 120 and second communication module 125 according to communication conditions of the corresponding networks.

The dual-standby mobile terminal may transition to a dual-standby mode by simultaneously activating the first communication module 120 and second communication module 125 upon a power-on state. Hence, the dual-standby mobile terminal may handle incoming calls from the GSM network and CDMA network at the same time. The dual-standby mobile terminal may handle incoming and outgoing calls through one of the first communication module 120 and the second communication module 125 when a preferred network is pre-selected. The dual-standby mobile terminal may control at least one of the first communication module 120 and the second communication module 125 for communication according to network conditions.

As described before, the control unit 130 includes the master modem 140 and the slave modem 145.

The master modem 140 may act as a main controller of the first mobile terminal 100, and control signal transmission and reception through the first communication module 120 and the second communication module 125. The master modem 140 examines a signal from one of the first communication module 120 and the second communication module 125, and may process the signal by itself or control the slave modem 145 to process the signal based on the examination.

More particularly, when a voice signal or data is received through the first communication module 120 from the second mobile terminal 200 on the GSM network 250, the master modem 140 controls the second communication module 125 to send the received voice signal or data to the third mobile terminal 300 on the CDMA network 350. The master modem 140 also controls the output means, such as a display unit and speaker, to output the voice signal or data received from the second mobile terminal 200.

The master modem 140 may control an operation to convert a voice signal of the user input by the microphone MIC into a voice packet, and to send the voice packet to the second mobile terminal 200 through the first communication module 120. The master modem 140 may also control an operation to convert data stored in the sharing storage area 180 into a data packet, and to send the data packet to the second mobile terminal 200 through the first communication module 120.

The slave modem 145 controls the operation of the first mobile terminal 100 under the control of the master modem 140. When a voice signal or data is received through the second communication module 125 from the third mobile terminal 300 on the CDMA network 350, the slave modem 145 controls the first communication module 120 to send the received voice signal or data to the second mobile terminal 200 on the GSM network 350. The slave modem 145 also controls the output means, such as a display unit or speaker, to output the voice signal or data received from the third mobile terminal 300.

The slave modem 145 may control an operation to convert a voice signal of the user input by the microphone MIC into a voice packet, and to send the voice packet to the third mobile terminal 300 through the second communication module 125. The slave modem 145 may also control an operation to convert data stored in the sharing storage area 180 into a data packet, and to send the data packet to the third mobile terminal 300 through the second communication module 125.

Next, host function control based on the master modem 140 and slave modem 145 is described.

When a voice packet is received through the first communication module 120 (S21), the master modem 140 forwards the received voice packet to the vocoder 135 (S21). When a voice packet is received through the second communication module 125 (S31), the master modem 140 notifies the slave modem 145 of the reception and transfers control to the slave modem 145, which then forwards the received voice packet to the vocoder 135 (S31).

When a voice packet from the vocoder 135 is detected, the master modem 140 identifies the destination of the voice packet, and controls the first communication module 120 to send the voice packet to the GSM network 250 according to the identification (S10 and S33). The slave modem 145 controls the second communication module 125 to send the voice packet from the vocoder 135 to the CDMA network 350 (S10 and S23).

The control unit 130 may control loopback of PCM data processed by the vocoder 135 (S22 and S32, or S22' and S32'). That is, when the dual-standby mobile terminal is in communication with both the GSM network and CDMA network and the host function is activated, to transfer a voice packet from one of the GSM network 250 and CDMA network 350 to the other network, the control unit 130 may control loopback of PCM data corresponding to the voice packet (S22 and S32, or S22' and S32'). The PCM data may be looped back from output terminals of the vocoder 135 (S22 and S32) or from input terminals of the codec 160 (S22' and S32'), depending upon the design.

The vocoder 135 decodes a voice packet from the control unit 130 into PCM data, and outputs the PCM data to the codec 160 (S21 or S31). The vocoder 135 encodes PCM data from the codec 160 into a voice packet, and outputs the voice packet to the control unit 130 (S10, S33 or S23). That is, the vocoder 135 encodes and decodes a voice signal (voice packet, PCM data). In particular, the vocoder 135 may return a voice packet from the control unit 130 thereto for loopback according to settings.

The codec 160 converts PCM data from the vocoder 135 into an analog voice signal (S21 or S31), and sends the analog voice signal to the speaker (SPK), which then outputs the analog voice signal as an audible sound. The codec 160 converts an analog voice signal from the microphone (MIC) into PCM data, and sends the PCM data to the vocoder 135 (S10). In particular, the codec 160 may return PCM data from the vocoder 135 thereto for loopback according to settings (S21 or S31) (S22' or S32') (S33 or S23).

On the other hand, the master modem 140 and slave modem 145 of the control unit 130 perform the host function in response to a data transfer event in communication with the second mobile terminal 200 and the third mobile terminal 300. A data transfer event may occur when data is received from a mobile terminal in communication or when the user of the first mobile terminal 100 issues a request for data transmission. A data transfer event may occur while the first mobile terminal 100 is in communication with the second mobile terminal 200 and third mobile terminal 300, or during a data-only connection.

When data is received through the first communication module 120 from the second mobile terminal 200 (the data from the second mobile terminal 200 is referred to as "first data") after activation of the host function, the master modem 140 demodulates the received data according to a preset format and stores the demodulated data in the first storage area 170. Upon detection of a data transfer event associated with the first data, the master modem 140 stores the first data in the sharing storage area 180 and outputs an interrupt signal to the slave modem 145 for notification of the first data.

Then, the slave modem 145 moves the first data in the sharing storage area 180 to the second storage area 175, modulates the first data, converts the modulated first data into a data packet and sends the data packet through the second communication module 125 to the third mobile terminal 300.

When data is received through the second communication module 125 from the third mobile terminal 300 (the data from the third mobile terminal 300 is referred to as "second data") after activation of the host function, the master modem 140 transfers the control to the slave modem 145. The slave modem 145 demodulates the received second data according to a preset format, and stores the demodulated second data in the second storage area 175. Upon detection of a data transfer event associated with the second data, the slave modem 145 stores the second data in the sharing storage area 180 and outputs an interrupt signal to the master modem 140 for notification of the second data.

Then, the master modem 140 moves the second data in the sharing storage area 180 to the first storage area 170, modulates the second data according to a preset format, converts the modulated second data into a data packet and sends the data packet through the first communication module 120 to the second mobile terminal 200.

The master modem 140 may output, according to a preset option or user request, the received data (first data and second data) through the output means, such as a display unit and speaker, in accordance with data types.

The first storage area 170 and second storage area 175 may store various types of data and voice signals (voice packet and PCM data), and may include a flash memory that preserves data even in a power-off state and enables easy data read and write. One of the first storage area 170 and second storage area 175 may store an application and associated setting data in relation to the host function. The sharing storage area 180 acts as a medium linking the master modem 140 and slave modem 145 together. That is, when the master modem 140 writes first data for the slave modem 145, the master modem 140 sends an interrupt signal to the slave modem 145 for notification of the first data. When the slave modem 145 writes second data for the master modem 140, the slave modem 145 sends an interrupt signal to the master modem 140 for notification of the second data. The sharing storage area 180 may include a dual port RAM.

Although the first storage area 170, second storage area 175 and sharing storage area 180 are represented as separate entities in FIG. 3, they may be formed as a single memory unit, which includes a storage section corresponding to the first storage area 170 and second storage area 175, and a sharing section corresponding to the sharing storage area 180.

Although the control unit 130, vocoder 135 and codec 160 are represented as separate entities in FIG. 2, they may be formed as a single chip control unit, which includes the master modem 140, slave modem 145, vocoder 135 and codec 160.

As described above, when the dual-standby mobile terminal of the present invention having two cards (GSM card and CDMA card) is connected to two mobile terminals on the GSM network 250 and CDMA network 350, the dual-standby mobile terminal may adjust voice and data transmission paths to transfer voice signals and data between the mobile terminals on the different networks.

The first mobile terminal 100 may send a voice packet or data packet to the second mobile terminal 200 on the GSM network 250 through the first communication module 120 and to the third mobile terminal 300 on the CDMA network 350 through the second communication module 125.

When the first mobile terminal 100 is connected to both the second mobile terminal 200 and third mobile terminal 300, the first mobile terminal 100 may block one of the two connections for transmission of a voice packet or data packet. Thereto, the first mobile terminal 100 may have a toggle function to selectively block the connections, and may include an input key for the toggle function.

When a voice signal is received from the second mobile terminal 200 on the GSM network 250, the first mobile terminal 100 returns, for loopback, the voice signal at the vocoder 135 or codec 160 to the second communication module 125 communicating with the CDMA network 350. Then, the second communication module 125 may send the voice signal from the second mobile terminal 200 on the GSM network 250 to the third mobile terminal 300 on the CDMA network 350.

Similarly, the first mobile terminal 100 may transfer a voice signal from the third mobile terminal 300 on the CDMA network 350 to the second mobile terminal 200 on the GSM network 250.

Accordingly, the first mobile terminal 100 may transfer a voice signal from a network to another network for loopback, like a voice signal input from the first mobile terminal 100, providing a multi-party call service. That is, the second mobile terminal 200 and third mobile terminal 300 on the different networks may be connected together through the first mobile terminal 100 and make a conference call.

Although a dual-standby mobile terminal supporting the GSM network 250 and CDMA network 350 is described as an example of the multi-standby mobile terminal of the present invention, the dual-standby mobile terminal is not limited to the GSM network and CDMA network. The dual-standby mobile terminal of the present invention may also be applied to a multi-standby mobile terminal supporting two or more existing commercial communication networks as well as those to be developed and deployed in the future.

Hereinabove, the configuration and operation of the mobile terminal of the present invention are described. Next, a host function control scheme is described.

Figure 4:
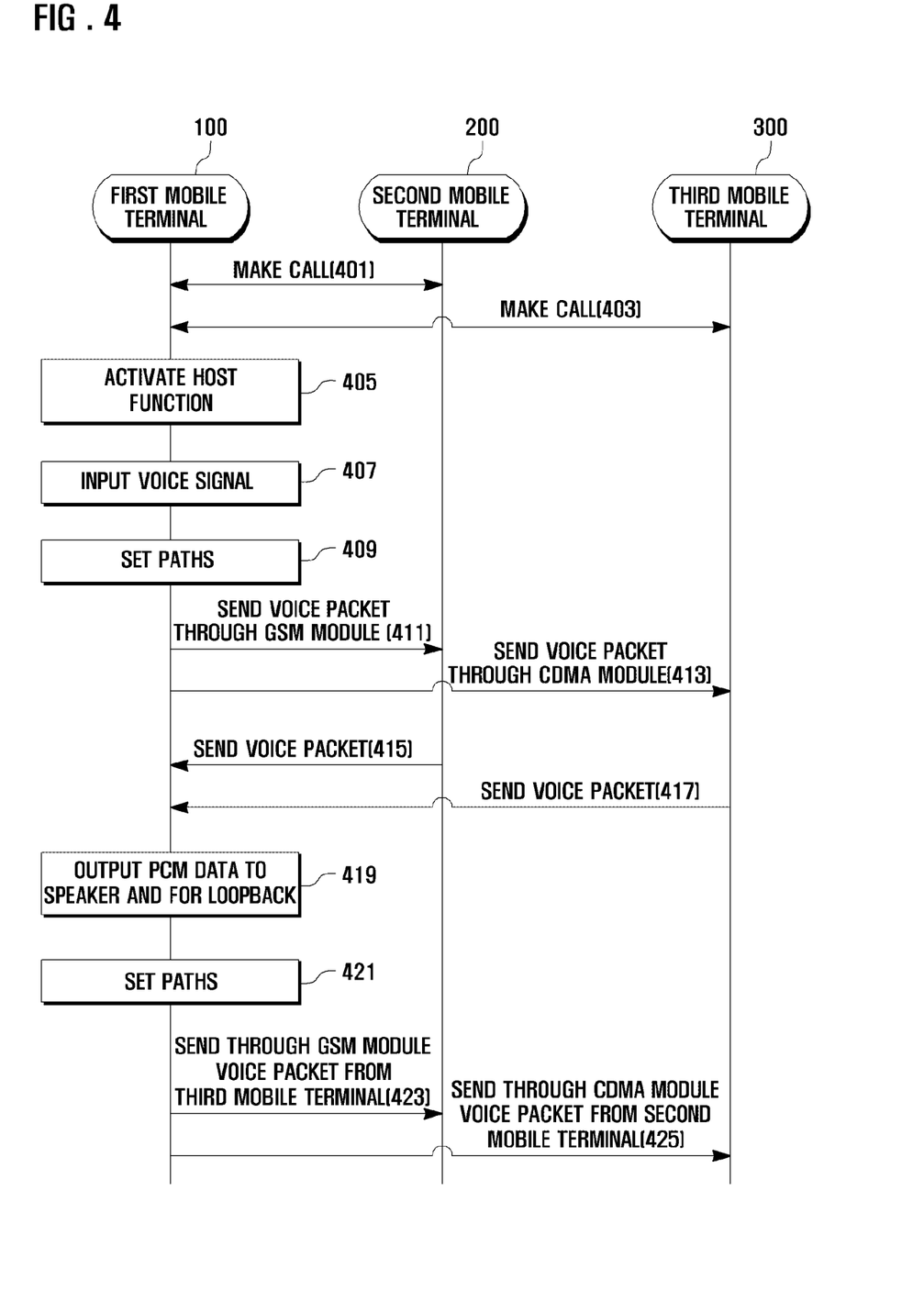
FIG. 4 is a sequence diagram illustrating voice signal transfer between mobile terminals on different networks according to an exemplary embodiment of the present invention.

FIG. 4 is a sequence diagram illustrating voice signal transfer between mobile terminals on different networks according to an exemplary embodiment of the present invention.

Referring to FIGS. 1 to 4, the first mobile terminal 100 makes a call to the second mobile terminal 200 on the GSM network 250 in step S401 and to the third mobile terminal 300 on the CDMA network 350 in step S403. The first mobile terminal 100 activates the host function in response to a request event in step S405. A request event is related to the host function, and may correspond to an event generated by the user or to a preset event automatically generated when a call is made between mobile terminals on different networks.

Thereafter, the first mobile terminal 100 may perform an operation related to sending or receiving a voice signal. Here, it is assumed that the first mobile terminal 100 sends a voice signal first and then receives a voice signal from the second mobile terminal 200 or third mobile terminal 300. However, a receiving operation may be performed before or at the same time as a sending operation.

The first mobile terminal 100 receives a voice signal of the user input from the microphone in step S407, and converts the voice signal to a voice packet through an above-described process for an originating voice signal and sets transmission paths for the voice packet in step S409. That is, because the first mobile terminal 100 is in communication with the second mobile terminal 200 on the GSM network 250 and the third mobile terminal 300 on the CDMA network 350, the first mobile terminal 100 reserves the first communication module 120 in relation to GSM communication and the second communication module 125 in relation to CDMA communication for voice packet paths.

The first mobile terminal 100 sends the voice packet to the second mobile terminal 200 through the first communication module 120 in step S411, and to the third mobile terminal 300 through the second communication module 125 in step S413. Here, as described before, the first mobile terminal 100 sends the voice packet to one of the second mobile terminal 200 and the third mobile terminal 300.

Next, the first mobile terminal 100 may process a voice packet coming from one of the second mobile terminal 200 on the GSM network 250 and the third mobile terminal 300 on the CDMA network 350.

The first mobile terminal 100 receives a first voice packet from the second mobile terminal 200 in step S415 and receives a second voice packet from the third mobile terminal 300 in step S417.

The first mobile terminal 100 converts the first voice packet and second voice packet to PCM data through an above-described process for a received voice packet, outputs the PCM data through the speaker (SPK), and starts a loopback process for the PCM data in step S419.

The first mobile terminal 100 converts the PCM data into voice packets through the above-described process for an originating voice signal, and sets transmission paths for the voice packets in step S421. That is, the first mobile terminal 100 reserves the second communication module 125, communicating with the third mobile terminal 300 on the CDMA network 350, for the voice packet associated with the second mobile terminal 200. The first mobile terminal 100 also reserves the first communication module 125, communicating with the second mobile terminal 200 on the GSM network 250, for the voice packet associated with the third mobile terminal 300.

The first mobile terminal 100 sends, through the set paths, the voice packet associated with the third mobile terminal 300 to the second mobile terminal 200 in step S423, and also sends the voice packet associated with the second mobile terminal 200 to the third mobile terminal 300 in step S425.

Figure 5:
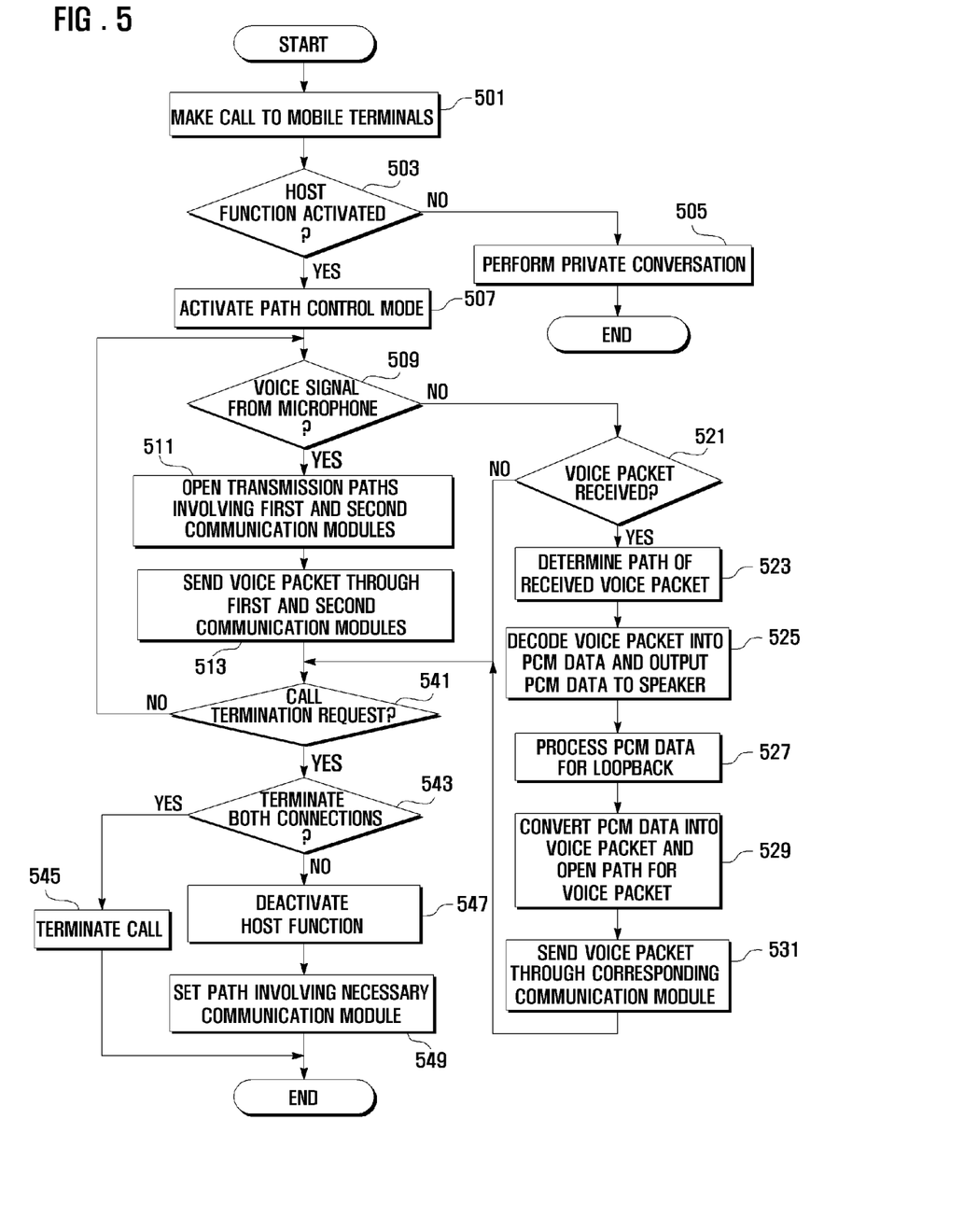
FIG. 5 is a flowchart illustrating a control procedure of a mobile terminal for conference calling according to an exemplary embodiment of the present invention.

FIG. 5 is a flowchart illustrating a control procedure of a mobile terminal for conference calling according to an exemplary embodiment of the present invention.

Referring to FIG. 5, a first mobile terminal 100 makes a call to a second mobile terminal 200 on a first network and to a third mobile terminal 300 on a second network in step S501. It is assumed that the first mobile terminal 100 is a multi-standby mobile terminal of the present invention, the first network is a GSM network 250, and the second network is a CDMA network 350. Hence, the first network is assumed to be distinct from the second network.

The first mobile terminal 100 verifies activation of the host function in step S503. The host function may be activated in response to a user request, or be automatically activated when a multiparty call is made between mobile terminals on different networks. Hence, step S503 may correspond to determining whether a user request for the host function is issued or an option for automatic host function activation is set.

If the host function is not activated, the first mobile terminal privately communicates with one of the second mobile terminal and third mobile terminal in step S505. That is, the first mobile terminal 100 may send and receive voice packets to and from one of the second mobile terminal 200 and third mobile terminal 300, and the other mobile terminal may remain in a wait mode until resumption of voice signal transmission.

If the host function is activated, the first mobile terminal activates a path control mode to control transmission and reception paths for voice packets in step S507. In step S507, the procedure is optional and may be skipped. The first mobile terminal determines whether a voice signal is input from the microphone in step S509.

If a voice signal is input from the microphone, the first mobile terminal 100 converts the voice signal into a voice packet, opens voice transmission paths involving the first communication module leading to the first network and second communication module leading to the second network in step S511, and sends the voice packet to the second mobile terminal 200 on the first network and to the third mobile terminal 300 on the second network in step S513. Here, the first mobile terminal 100 may block one of the voice transmission paths according to a user request, and send the voice packet to only one of the second mobile terminal 200 and third mobile terminal 300.

If a voice signal is not input from the microphone at step S509, the first mobile terminal determines whether a voice packet is received from one of the second mobile terminal 200 and third mobile terminal 300 in step S521. If a voice packet is received, the first mobile terminal 100 determines which of the second mobile terminal 200 and third mobile terminal 300 has sent the voice packet in step S523. That is, the first mobile terminal 100 determines whether the received voice packet is received through the first communication module 120 and associated with the second mobile terminal 200 on the first network, or is received through the second communication module 125 and associated with the third mobile terminal 300 on the second network. Then, the first mobile terminal may determine the voice transmission path for loopback.

The first mobile terminal 100 decodes the received voice packet into PCM data and outputs the PCM data through the speaker in step S525. The first mobile terminal 100 converts the PCM data into a voice packet for loopback in step S525, and opens a corresponding voice transmission path in step S529.

That is, the first mobile terminal 100 reserves one of the first communication module 120 and second communication module 125 involved in the voice transmission path for loopback. The first mobile terminal 100 sends the voice packet through the reserved communication module to the corresponding mobile terminal in step S531. Here, the network associated with the incoming voice packet is distinct from that associated with the outgoing voice packet for loopback.

During voice signal processing, the first mobile terminal 100 determines whether a call termination request is issued in step S541. If a call termination request is issued, the first mobile terminal 100 determines whether the issued call termination request applies to both the first mobile terminal 100 and second mobile terminal 200 in step S543. If the issued call termination request applies to both the first mobile terminal 100 and second mobile terminal 200, the first mobile terminal 100 deactivates the first communication module 120 and second communication module 125 to terminate the multiparty call in step S545.

If the issued call termination request applies to one of the first mobile terminal 100 and second mobile terminal 200, the first mobile terminal 100 terminates the call to the requested mobile terminal and deactivates the host function in step S547. The first mobile terminal 100 sets a voice transmission and reception path to the mobile terminal still in communication in step S549. That is, voice packets are processed in an ordinary (e.g., separate call) manner.

Figure 6:
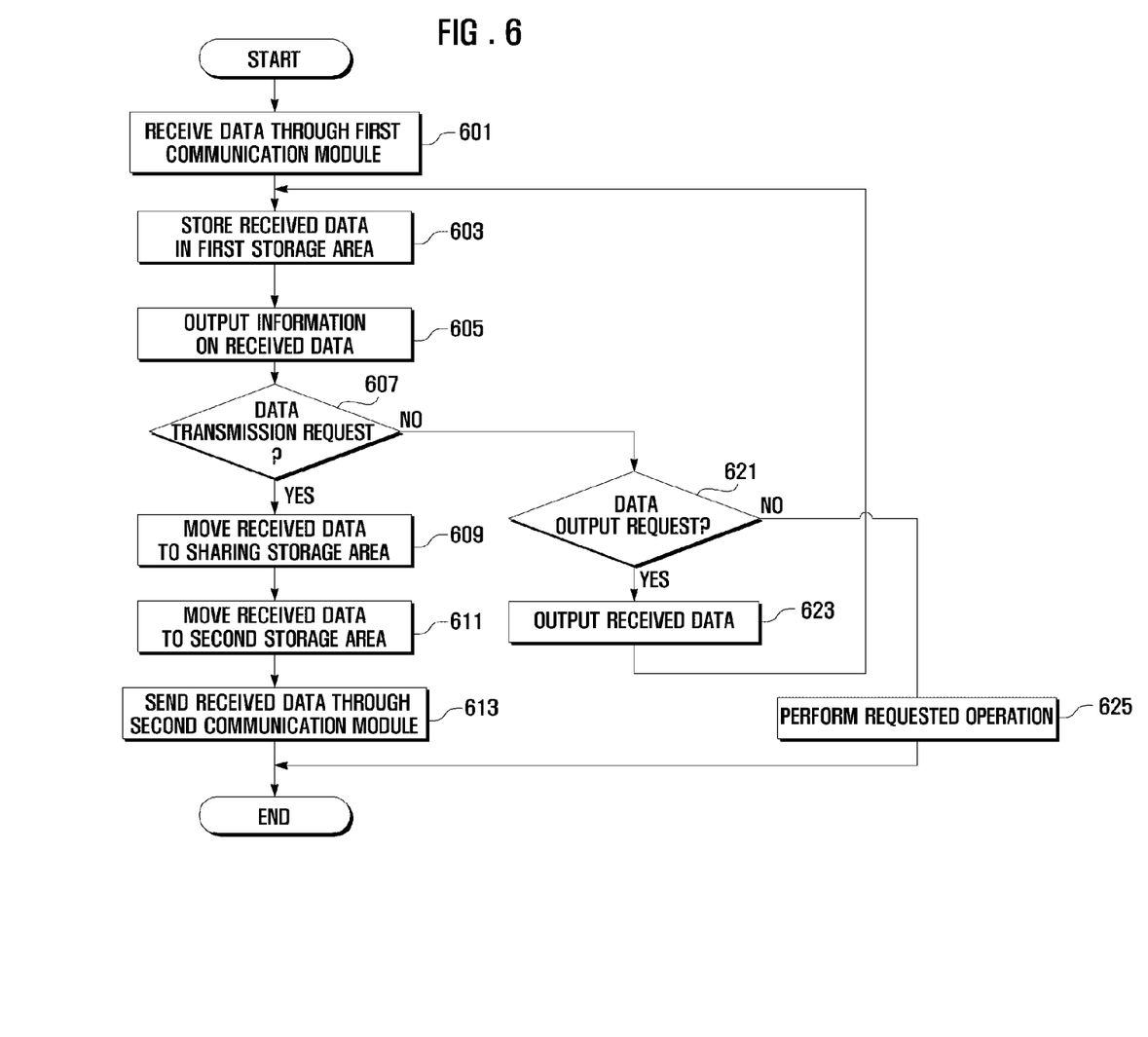
FIG. 6 is a flowchart illustrating a control procedure of a mobile terminal for data sharing according to an exemplary embodiment of the present invention.

FIG. 6 is a flowchart illustrating a control procedure of a mobile terminal for data sharing according to an exemplary embodiment of the present invention.

In the following description, it is assumed that a call connection is made between the first mobile terminal 100, second mobile terminal 200 and third mobile terminal 300 after activation of the host function, and the first mobile terminal 100 transfers data received from the second mobile terminal 200 to the third mobile terminal 300.

However, the present invention is not limited to the above assumption, and data transfer may be performed while a call connection is not made between mobile terminals. Further, the first mobile terminal 100 may transfer data received from the third mobile terminal 300 to the second mobile terminal 200, and may send data to one or both of the second mobile terminal 200 and third mobile terminal 300.

Referring to FIG. 6, the master modem of the first mobile terminal 100 receives data through the first communication module 120 from the second mobile terminal 200 in step S601, stores the received data in the first storage area 170 in step S603, and outputs information on the received data through an output means according to settings in step S605. If an option for information on received data is not set, step S605 may be skipped.

The master modem determines whether a transmission request for the received data is issued in step S607. A transmission request for received data may be automatically issued when data is received from the second mobile terminal 200, or be issued in response to a user selection.

If a transmission request for the received data is issued, the master modem stores the received data in the sharing storage area 180 in step (S609), and sends an interrupt signal to the slave modem for notification of the data.

In response to the interrupt signal, the slave modem moves the received data in the sharing storage area 180 to the second storage area 175 in step S611, and sends the received data through the second communication module 125 to the third mobile terminal 300 in step S613.

If a transmission request for the received data is not issued in step S607, the master modem determines whether an output request for the received data is issued in step S621. If an output request for the received data is issued, the master modem outputs the received data stored in the first storage area 170 through an output means, such as a display unit or speaker in step S623.

If an output request for the received data is not issued, the master modem performs a requested operation in step S625. For example, the master modem may await a command from the user for the data.

While the invention has been shown and described with reference to exemplary embodiments thereof, it will be understood by those skilled in the art that various changes in form and details may be made therein without departing from the spirit and scope of the invention as defined in the appended claims and their equivalents.

What is claimed is:

1. A method for providing a host function between different cellular networks in a multi-standby mobile terminal, comprising:

creating a call from a first mobile terminal, as a multi-standby mobile terminal, to a second mobile terminal on a first cellular network and to a third mobile terminal on a second cellular network;

outputting a received voice signal through a speaker of the first mobile terminal, when the voice signal is received from one of the second mobile terminal and third mobile terminal;

transmitting, from the first mobile terminal, the received voice signal through a loopback process to one of the second mobile terminal and third mobile terminal that does not transmit the voice signal;

receiving, by the first mobile terminal, data from at least one of the second mobile terminal and third mobile terminal;

storing the received data in a sharing storage area; and transmitting, from the first mobile terminal, the received data to the one of the second mobile terminal and third mobile terminal that does not transmit the voice signal, wherein the storing of the received data in the sharing storage area comprises:

storing, by a first modem, received data in a sharing storage area; and outputting an interrupt signal to a second modem associated with a transmission path for the data, wherein the first cellular network and the second cellular network support different communication standards.

2. The method of claim 1, wherein the transmitting of the received voice signal through the loopback process comprises:

converting the PCM data back into a voice packet; and transmitting the voice packet through a corresponding communication module reserved for a transmission path.

3. The method of claim 1, further comprising:

forming at least one transmission path from the first mobile terminal by reserving at least one of communication modules leading respectively to the second mobile terminal and third mobile terminal, when a voice signal is input from a microphone; and transmitting the input voice signal to at least one of the second mobile terminal and third mobile terminal through the at least one of the communication modules.

4. The method of claim 3, further comprising controlling voice transmission paths involving the communication modules and controlling an operation to transmit at least one of a received voice signal and received data to the at least one of the second mobile terminal and third mobile terminal, that does not transmit the voice signal.

5. The method of claim 4, further comprising:

converting a voice signal in a preset format; and converting a voice signal for loopback.

6. The method of claim 3, further comprising:

storing data received through the communication modules; and sharing data.

7. The method of claim 1, wherein the sending of the received data to the one of the second mobile terminal and third mobile terminal, which do not transmit the voice signal, comprises transmitting received data stored in the sharing storage area through a communication module associated with the transmission path, in response to the interrupt signal, by the second modem.

8. The method of claim 7, further comprising sending from the first mobile terminal, at least one of a generated voice signal and generated data to at least one of the second mobile terminal and third mobile terminal.

9. The method of claim 1, further comprising transferring control to the second modem from the first modem in accordance with a transmission path of at least one of a voice signal and data.

10. The method of claim 1, wherein the outputting of the received voice signal through the speaker comprises:

converting the received voice signal into a voice packet and decoding the voice packet into Pulse Code Modulation (PCM) data;

converting the PCM data into an analog voice signal; and outputting the analog voice signal to the speaker.

* * * * *